Figure 1:
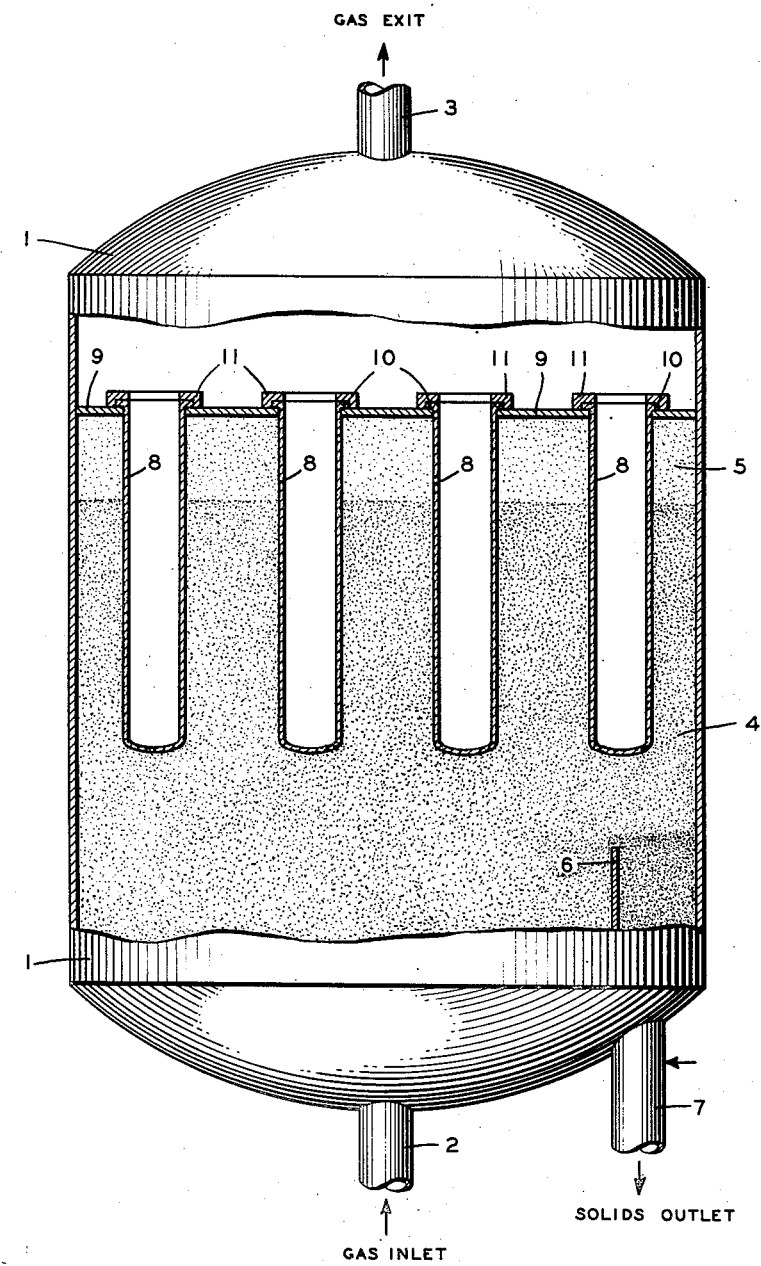

April 17, 1951     W. J. DEGNEN ET AL     2,548,875

CONTACTING GASES AND SOLIDS

Filed Jan. 7, 1947     2 Sheets-Sheet 1

INVENTORS
WILLIAM J. DEGNEN
LUTHER R. HILL
BY
ATTORNEYS

April 17, 1951 W. J. DEGNEN ET AL 2,548,875
CONTACTING GASES AND SOLIDS
Filed Jan. 7, 1947 2 Sheets-Sheet 2

INVENTORS
WILLIAM J. DEGNEN
LUTHER R. HILL
BY E. F. Liebrecht
G. J. Palmer
ATTORNEYS Patented Apr. 17, 1951

2,548,875

UNITED STATES PATENT OFFICE 2,548,875

CONTACTING GASES AND SOLIDS

William J. Degnen, Westfield, and Luther R. Hill, Ridgewood, N. J., assignors to The M. W. Kellogg Company, Jersey City, N. J., a corporation of Delaware Application January 7, 1947, Serial No. 720,552

3 Claims. (Cl. 23—1)

This invention relates to improvements in the separation of gases and vapors from finely divided solids suspended therein. More particularly the invention relates to improvements in methods and apparatus for continuously contacting a gas with a finely divided solid to effect treatment of the solid or gas, or both. Still more particularly the invention relates to improvements in methods and apparatus for contacting a gas with a finely divided solid which is maintained in the contact zone in a fluidized pseudo-liquid condition by passing the gas therethrough at a suitable velocity. The treatments to be carried out in such contact zones include heat exchange between the gas and the solid, catalytic reactions involving the gas as a reactant and involving the solid as a contact agent or catalyst or as a reactant, thermal conversion treatment by means of heat contained in the solid, combustion of carbonaceous deposits on the surfaces of the catalyst powders, and distillation of liquids contained in finely divided solids.

The invention will be described in detail by reference to a contact process in which a finely divided solid is maintained in a fluidized condition. However, since the invention is concerned particularly with the withdrawal of the gas or vapor from the contact zone while separating the finely divided solids therefrom, it is evident that the invention includes within its scope the separation of gases from finely divided solids without reference to the previous condition or relation of the solids and gas. It will be apparent that the various methods of operation to be described in more detail are applicable to the simple separation of a gas or vapor from finely divided solids suspended therein.

In contacting a gas with a fluidized powdered solid the finely divided or powdered solid is maintained in a suitable contact chamber. The gas is introduced into the contact chamber at a low point through one or more inlets whose aggregate cross-sectional area is substantially smaller than the horizontal cross-sectional area of the contact chamber. The gas stream thus enters the contact chamber through inlets in which it travels at a substantially higher velocity than the velocity assumed by the gas stream in the contact chamber. The velocity of the gas stream in the inlets is sufficiently high to prevent the passage of finely divided solids out of the chamber through such gas inlets. In operations of this character the gas ordinarily is passed up through the contact chamber at a relatively low superficial velocity in the range of 0.5 to about 6 feet per second. The superficial velocity is the velocity the gas or vapor would assume in the contact chamber in the absence of the finely divided solids and at the temperature and pressure to be employed in the process.

The finely divided solids ordinarily are employed in a range of particle sizes, including a large proportion of particles of 1 to 100 microns average diameter. The use of powders consisting of particles of substantially uniform size, in the form of small spheres, also has been suggested. The present invention is applicable to processes employing such "micro-spheres" as well as to processes employing powders having a range of particle sizes.

The passage of the gas stream upwardly through the solids mass at the preferred velocity suspends the solids mass in the stream and maintains the greater part of the solids mass in a fluidized pseudo-liquid condition in which the concentration of solid particles is relatively high. In this dense phase condition the solids may be said to be suspended in the gas stream but not entrained therein in the sense that there is movement of the mass, as such, in the direction of flow of the gas stream.

The dense phase of the solids mass occupies the lower part of the contact chamber, while the upper part of the chamber above the dense phase is occupied by a mixture of gases and powder in which the concentration of solids is much lower than the concentration of solids in the dense phase. This diffuse phase may be said to be a disengaging zone in which some of the solids lifted above the dense phase by the gas stream are disengaged and returned to the dense phase by the action of gravity. The gas stream is withdrawn from the contact chamber at an upper point thereof through an outlet corresponding in aggregate size generally to the size of the gas inlet.

It is characteristic of this "fluidized" system of operation that the settling rate of at least some of the particles of the solids mass is lower than the gas velocity in the contact chamber. Consequently the gas stream tends to entrain and carry out of the contact chamber a small, but appreciable, proportion of the solids mass. In order to retain such solids in the contact chamber, or recover such entrained solids and return them to the system, the contact chamber ordinarily is designed to provide a relatively large volume above the space occupied by the dense phase of the solids mass. This facilitates settling a large proportion of the solids carried upwardly out of the dense phase. To intensify this effect the upper part of the contact chamber may be enlarged in horizontal cross-section to reduce further the linear velocity of the gas stream and promote settling of suspended solids.

Simple settling, however, is not effective to remove all the suspended solids from the exit gas stream. To supplement settling, various means have been resorted to for separating further amounts of suspended solids from the exit gas stream. Filters have been employed either in the upper part of the contact chamber occupied by the diffuse phase or outside the contact chamber and connected with the outlet line. Cyclone separators also have been employed, and these may be located within the contact chamber in the upper portion thereof or outside the chamber and connected with the exit line. Electrostatic precipitators also have been employed, and these ordinarily are located outside the contact chamber and connected with the outlet line. Scrubbing the exit gas stream with liquids also has been employed. This separates the solids from the gas stream as a slurry of the solids in the scrubbing liquid.

Each of these means for separating solids from the gas stream from the contact chamber has certain disadvantages. Filters located in the diffuse phase in the contact chamber become caked with finely divided solids and must be cleared periodically by a reverse flow of gas. Cyclone separators are relatively expensive and do not completely remove suspended solids. Electrostatic precipitators will remove solids not removed by cyclone separators, and ordinarily are employed in conjunction with cyclone separators. However, electrostatic precipitators are expensive to install and maintain and operate efficiently only at relatively low temperature. Removal of solids by scrubbing ordinarily cools the gas stream and requires recovery of the solids from the resulting slurry.

The best known commercial process involving continuous contact of gas with a powdered solid under the conditions described above is the "fluidized" catalytic cracking process. In this process hydrocarbon vapors are passed upwardly through a reaction zone containing a mass of powdered cracking catalyst. Catalyst is continuously transferred from the reaction zone to a regeneration zone, in which the catalyst mass is maintained in a fluidized pseudo-liquid condition by suitable control of the velocity of the oxygen-containing stream of regeneration gas. The vapor stream from the reaction zone ordinarily is passed through a series of cyclone separators to remove suspended catalyst, and such removed catalyst ordinarily is returned directly to the dense phase in the reactor. Catalyst not separated from the reaction gases by the cyclone separators is recovered as a slurry by scrubbing the gases with high-boiling hydrocarbon oil. The catalyst is then separated from the slurry, reslurried with liquid charging stock, and returned to the reaction zone. Catalyst is separated from the regeneration gases by means of similar cyclone separators and the regeneration gases pass from the cyclone separators through one or more electrostatic precipitators. Regenerated catalyst separated by the cyclone separators and the electrostatic precipitators is returned either to the regeneration zone or to the reaction zone. Catalyst is continuously transferred from the regeneration zone to the reaction zone, to complete the cycle.

It is an object of this invention to provide a method and apparatus for separating gases and vapors from finely divided solids suspended therein, which are free from the objections to previous methods and apparatus for accomplishing the same result. It is a further object of this invention to provide a method and apparatus for contacting gases and vapors with finely divided solids in the fluidized solids system of operation described above while providing efficient and effective separation of solids from the outgoing gases and vapors. It is a further object of the invention to provide a method and apparatus for separating suspended solids which eliminates or reduces the necessity for reverse flow of gas, lowers the initial and maintenance costs of the equipment, eliminates the necessity for recovering solids from slurries, and separates solids in the contact chamber in a highly efficient manner.

The improved method and apparatus of this invention will be described in detail by reference to the accompanying drawings. In the detailed description the finely divided solids will be referred to as a catalyst powder, and the gas stream passing through the contact chamber will be referred to simply as a gas. It will be understood, however, that the invention is equally applicable to any operation in which any finely divided solid is contacted with any gas under conditions which maintain the finely divided solid in a dense fluidized pseudo-liquid condition by the passage of the gas stream through a mass of the solids at a velocity effective to entrain a part of the solids mass. It will be understood, furthermore, that the invention is applicable to the separation of gases and vapors from finely divided solids suspended therein, regardless of the previous condition or relation of the gases and solids.

Figure 1 in the drawing shows a gas-solid contact chamber in which the porous membrane, by which the gas stream leaving said chamber is filtered free from solids, is in the form of a plurality of thimbles.

Figure 2:
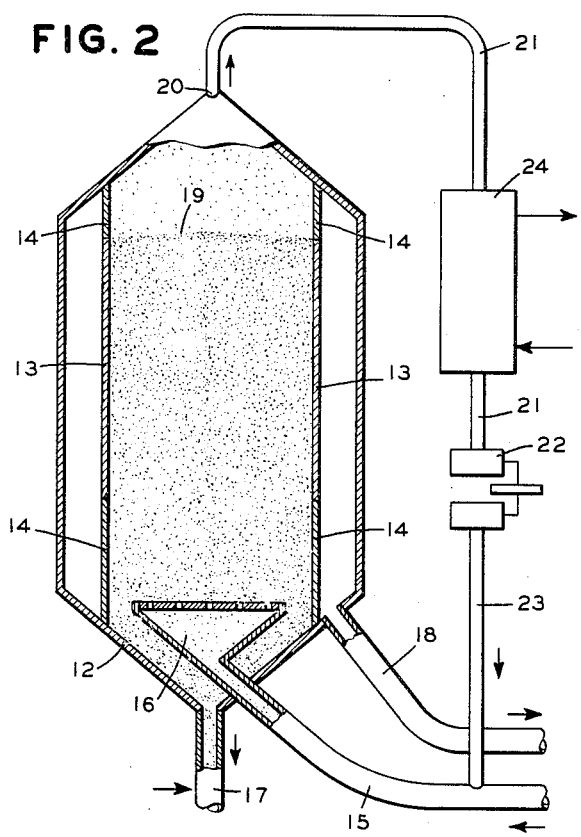

Figure 2 in the drawing shows a modification of said contact chamber in which said porous member constitutes a portion of the wall thereof.

Figure 2 in the drawing shows a modification of said contact chamber in which said porous member constitutes a portion of the wall thereof.

Figure 3:
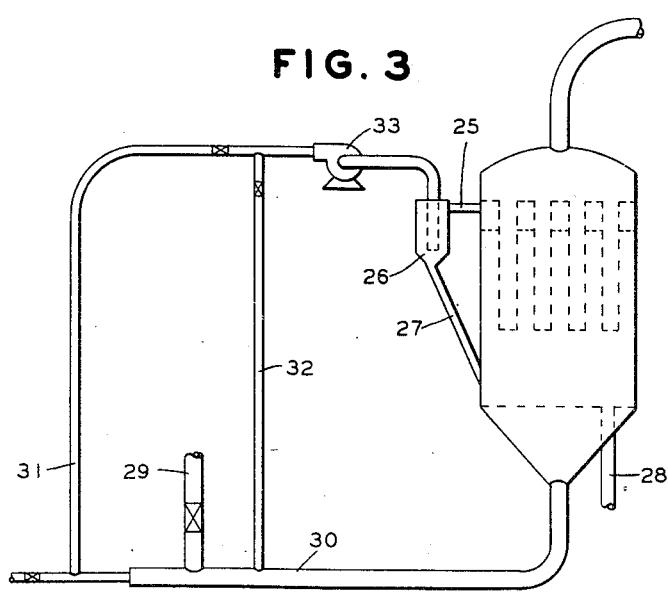

Figure 3 in the drawing shows a modification of the contact chamber of Figure 1 which provides for recirculation of a portion of the filtered gas thereto to aid in the filtering operation.

Figure 4:
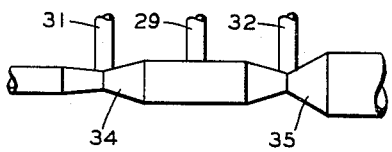

Figure 4 in the drawing shows in detail a part of the recirculating means for the apparatus of Figure 3.

Figure 5:
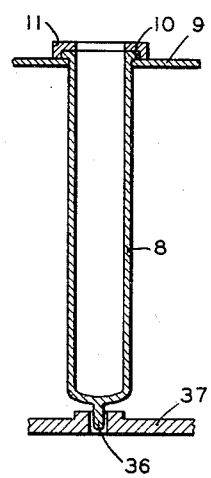

Figure 5 in the drawing shows in detail the manner in which the thimbles in the apparatus of Figure 1 are supported.

Referring to Fig. 1, a contact chamber 1 is provided in a suitable vessel which has a gas inlet 2 in the lower portion thereof and a gas exit 3 at the top. The gas passes upwardly through vessel 1 at a velocity effective to suspend the powdered catalyst in the gas stream as a relatively dense pseudo-liquid fluidized phase 4, overlain by a diffuse phase 5 in which the concentration of catalyst is much lower and of a different order of magnitude than the concentration of the catalyst in the dense phase. A vertical baffle 6 may be provided at one side of vessel 1 in the lower portion thereof to set off a portion of the contact chamber as a collecting zone in which catalyst is withdrawn from the upward path of flow of the gas stream and collected for withdrawal from vessel 1 through a suitable pipe 7, which connects with vessel 1 at the bottom of the collecting zone. Ordinarily catalyst is continuously withdrawn from vessel 1 through pipe 7, which may be a standpipe developing a static pressure. Catalyst thus withdrawn is transferred to another zone for treatment and is thereafter returned to vessel 1 by any suitable means to maintain the quantity of catalyst in vessel 1 at the desired figure. Catalyst may be introduced into vessel 1 directly through a separate connection, not shown, or it may be introduced by entrainment in the gas stream entering through line 2. It will be understood, however, that means for collecting, withdrawing, transferring and charging catalyst are well known to those skilled in this art, and that the specific means shown in the drawings for such operations form no part of the present invention.

To separate the catalyst particles from the gas stream in vessel 1 whereby the gas passing out through exit 3 is substantially stripped of catalyst, the gas stream, in accordance with the present invention, is passed, in the contact chamber, through a porous membrane which is substantially impervious to the catalyst but permits passage of the gas at the required rate. In accordance with this invention the porous membrane, or filter, is generally vertical and is totally or largely submerged in the dense phase of catalyst in the contact chamber. It is characteristic of the fluidized pseudo-liquid mass of catalyst in the dense phase that the mass of catalyst is highly turbulent and that catalyst particles circulate through the mass at a high rate. In accordance with this invention, therefore, the rapidly circulating catalyst particles in the dense phase are caused to impinge in large numbers on the surface of the porous membrane, both within the dense phase and immediately above the dense phase. By the action of such impinging particles the entering surface of the porous membrane is kept relatively free of adherent catalyst particles and the amount of catalyst adhering to the surface of the porous membrane is sufficiently restricted to prevent an undesired increase in the pressure required to force the gas through the porous membrane.

As shown in Fig. 1, the porous membrane may be provided by a plurality of vertical cylinders, or "thimbles" 8, which have the desired porosity and which extend downwardly from a point in the diffuse phase to a level substantially below the upper level of the dense phase. Thus a substantial proportion of each thimble 8 is submerged in the dense phase. The thimbles may be employed in whatever number and size is necessary to provide the required filter surface and they may be mounted in the contact chamber in any suitable manner. Preferably the thimbles 8 are porous metal filters, but they may also be formed of porous ceramic material of the kind ordinarily employed for ceramic filters. Thimbles 8 necessarily are constructed in a manner to provide the strength necessary to resist the destructive effects of pressure and temperature variations.

For mounting the thimbles 8 in vessel 1 a metal plate 9 may be provided to extend across the upper part of vessel 1. Plate 9 is provided with a plurality of holes to accommodate the filters 8, and the latter may be provided with flanged open ends, as shown at 10, for suspending the filters from plate 9. Flanges 11 may be provided to anchor the thimble filters 8 to plate 9.

The gas stream passes into chamber 1 through line 2, passes upwardly through the fluidized mass 4 of catalyst, passes into filter thimbles 8, and passes out of vessel 1 through line 3. The catalyst particles are retained in that portion of vessel 1 below plate 9 by the filtering action of the thimbles 8. The turbulence of the dense phase of catalyst and the rapid rate of circulation of catalyst in the dense phase acts to scour the surfaces of filters 8 and prevent the accumulation of catalyst fines on such surfaces as a cake which causes an excessive reduction in porosity.

The action of the catalyst particles in the fluidized dense bed in maintaining the filter surfaces relatively free of catalyst accumulations results from the scouring action of the circulating particles. The rate of circulation of the particles and the individual velocities of the particles are governed somewhat by the degree of turbulence of the dense bed, which in turn depends upon the linear velocity of the gas stream passing through the dense bed. It is evident, therefore, that the scouring effect is intensified by the use of relatively high velocities within the range of velocities which maintain the catalyst in a dense fluidized condition. In accordance with this improved operation somewhat higher velocities may be employed than in previous operations, since the improved method of operation eliminates the use of separating devices, such as cyclones, which might be overloaded by the increased catalyst loading resulting from higher linear velocities. This represents a further advantage in the use of the improved method and apparatus, since the use of higher linear velocities permits the employment of contact zones of smaller diameter, which represent a more efficient design.

In Fig. 1 the porous membrane is provided in a plurality of vertical cylinders or thimbles. This arrangement is desirable as providing a relatively large area of filtering surface. It is to be understood, however, that this particular arrangement of the filtering surface is not essential, nor is it essential that the porous membrane be in a vertical plane. The filtering surface may be arranged vertically, as shown in Fig. 1, or may be horizontal, or at an angle. Vertical surfaces ordinarily are employed in order to permit mounting sufficient filtering surface in a contact chamber.

The arrangement of the porous membrane within the contact chamber as shown in Fig. 1 is not essential. For example, the porous membrane could be arranged in the outside wall of the contact vessel and extend a substantial distance below the upper level of the dense phase of catalyst. In accordance with this modification the gas stream would pass laterally out of the contact vessel through a porous side wall largely submerged in the dense catalyst phase, the porous side wall being provided conveniently by setting porous filter blocks in suitable openings in the side wall of the contact vessel.

The last mentioned arrangement is illustrated in Fig. 2, in which the contact zone is contained in vessel 12, from which the contact zone is separated entirely or at intervals around its circumference by means of filter blocks 13 suitably mounted within vessel 12 in frame elements 14. The gas stream is introduced into the bottom of vessel 12 through line 15 which connects with a distributor 16 which is located in the bottom of the vessel 12. The catalyst mass is maintained in a fluidized condition in vessel 12 by suitable regulation of the gas velocity as described above, and a portion of the catalyst may be withdrawn continuously or intermittently by permitting it to pass downwardly around distributor 16 into the bottom of vessel 12 from which it is withdrawn through line 17. The gases pass out through filter plates 13 into the space between the plates and the side wall of vessel 12 and are withdrawn from vessel 12 through one or more suitable exits, such as line 18. The turbulence of the dense catalyst bed and the rapid movement of catalyst particles within the bed at relatively high particle velocities effectively scours the surfaces of filters 13 and maintains them in a condition of sufficient permeability.

The porous membranes illustrated in Figs. 1 and 2 may be arranged in the contact vessel in position to be either partly covered by the dense mass of catalyst or completely covered by the turbulent mass of catalyst. The arrangement in which they are partially submerged is illustrated by Fig. 1, whereas complete submersion is illustrated in Fig. 2 in which the upper level of the dense bed is indicated at 19.

In order to maintain a sufficiently high velocity of gas, particularly in the upper part of the contact zone, it may be desirable to pass a part of the gas stream upwardly past the filtering surfaces and the upper level of the dense phase and recirculate it to the entrance of the contact chamber. This arrangement is illustrated in Fig. 2, in which an upper exit 20 is provided at the top of vessel 12 for withdrawing a part of the gas stream which has been introduced through line 15, the other part being withdrawn through line 18. The portion of the gas stream withdrawn through exit 20 is passed through line 21 for return into the lower portion of vessel 12. Conveniently this is accomplished by reintroducing the gas stream withdrawn at 20 into line 15 by connecting line 21 to a suitable compressor or blower 22. By means of blower 22 the recirculated gas stream is reintroduced into line 15 through line 23. The recirculated gas stream may be subjected to treatment externally of vessel 12 in order to modify the conditions within vessel 12. For example, if vessel 12 is the location of an exothermic reaction it may be desirable to cool the recirculated gas stream to withdrawn at least a portion of the heat of reaction. Alternatively, it may be desirable to heat the recirculated gas stream to provide the heat required by an endothermic reaction in vessel 12. For this purpose heating or cooling means 24 is indicated in line 21. Such heating or cooling means preferably comprises indirect heat exchange with a cooling or heating medium, such as water or steam. However, the treatment of the recirculated gas stream by direct heat exchange is included within the scope of the process.

The recirculation of the gas stream when employing filtering means of the type illustrated in Fig. 1 is illustrated schematically in Fig. 3. In Fig. 3 the tubular filtering elements are only partly submerged in the dense phase. A portion of the gas stream is withdrawn from the contact chamber at a point above the level of the dense catalyst phase as indicated by line 25. The gas stream thus withdrawn will contain finely divided solids suspended therein, and it may be desirable to separate a portion of this suspended solid material from this gas stream prior to recirculation. For this purpose line 25 is connected with a suitable cyclone separator 26. In separator 26 a large proportion of the solids are separated from the gas stream. The solids thus separated collect in the bottom of separator 26 and are returned to the contact vessel through line 27. In line 27 the solid particles are maintained in a sufficiently fluidized condition to facilitate flow through line 1 at a substantially higher density than the catalyst in the dense phase in the contact chamber. By this means the pressure drop through cyclone separator 26 is balanced and the catalyst in line 27 flows back into the contact chamber.

The recirculated gas stream may be recombined with the fresh gas stream in any suitable manner. If catalyst is continuously withdrawn from the contact chamber, as through line 28, it is necessary to maintain the quantity of catalyst in the contact chamber by continuous introduction of catalyst as through standpipe 29 which connects with line 30 through which the fresh gas flows into the bottom of the contact chamber. The recirculated gas stream may be combined with fresh gas prior to the introduction of catalyst from standpipe 29 by connecting the outlet of cyclone separator 26 and line 30 by means of line 31, as shown. Alternatively, the gas being recirculated through line 31 may be introduced into the fresh gas stream after the introduction of catalyst into that stream, by means of line 32. For overcoming the pressure drop through line 30, the contact chamber, and separator 26, a compressor or blower 33 may be provided in line 31. Alternatively, the pressure drop may be overcome by introducing the fresh gas stream through an injector, as illustrated in Fig. 4. In Fig. 4 the fresh gas stream may be passed through an injector 34 prior to the introduction of catalyst through standpipe 29, or the fresh gas and suspended catalyst may be passed through an injector 35, located in line 30.

The use of elongated filters or thimbles of the type illustrated in Fig. 1 may require the provision of supporting means to balance the lateral thrust of the turbulent catalyst bed against the thimbles. For this purpose it may be desirable to provide a horizontal frame work in the contact zone for anchoring the lower ends of the thimbles. An arrangement of this type is illustrated in Fig. 5. In this arrangement each thimble 8 is provided at the lower end thereof with an elongated solid extension 36 which is vertically slideably mounted within the horizontal frame work indicated diagrammatically at 37. By this means the thimble 8 is supported against lateral thrusts but is permitted vertical extension and retraction as the result of heating and cooling of the filter.

We claim:

1. A method for contacting a gas with finely divided solids which comprises passing said gas upwardly in a contact zone through a loose mass of finely divided particles of said solids at a relatively low velocity to maintain the finely divided solids as a lower dense phase in which the contact particles are maintained in relatively high concentration in a fluidized pseudo-liquid condition and as an upper diffuse phase containing solids in low concentration, withdrawing a portion of said gas from said contact zone through a porous membrane which is substantially impervious to said solid particles and which contacts said dense fluidized mass of solids over a substantial area of said porous membrane, withdrawing another portion of said gas directly from said upper diffuse phase and from said contact zone without passage through said porous membrane, and reintroducing said last-mentioned withdrawn gas into said contact zone at a low point thereof and into contact with said fluidized mass of solids.

2. The method of claim 1 wherein said portion of gas withdrawn directly from said upper diffuse phase and reintroduced into the contact zone at a low point thereof is subjected to heat exchange to adjust its temperature prior to reintroduction into the contact zone.

3. The method of claim 1 wherein the portion of said gas directly withdrawn from said upper diffuse phase without passage through said porous membrane is passed into a centrifugal separation zone to effect separation therefrom of suspended finely divided solids carried from said contact zone in suspension in said gas, the finely divided solids separated from said gas in said centrifugal separation zone are returned directly to said contact zone, and the gas after passage through said centrifugal separation zone is then reintroduced into said contact zone.

WILLIAM J. DEGNEN.
LUTHER R. HILL.

REFERENCES CITED

The following references are of record in the file of this patent:

UNITED STATES PATENTS

| Number | Name | Date |
| --- | --- | --- |
| 2,401,739 | Johnson | June 11, 1946 |
| 2,429,751 | Gohr et al. | Oct. 28, 1947 |